(12) United States Patent
Bittner

(10) Patent No.: US 8,297,634 B2
(45) Date of Patent: Oct. 30, 2012

(54) SUSPENSION SYSTEM FOR AN AGRICULTURAL VEHICLE

(75) Inventor: Roy Bittner, Cato, WI (US)

(73) Assignee: Miller-St. Nazianz, Inc., St. Nazianz, WI (US)

(*) Notice: Subject to any disclaimer, the term of this patent is extended or adjusted under 35 U.S.C. 154(b) by 485 days.

(21) Appl. No.: 12/496,834

(22) Filed: Jul. 2, 2009

(65) Prior Publication Data

US 2010/0019060 A1 Jan. 28, 2010

Related U.S. Application Data

(60) Provisional application No. 61/083,090, filed on Jul. 23, 2008.

(51) Int. Cl.
*B60G 11/26* (2006.01)
(52) U.S. Cl. ............. 280/124.16; 180/209; 280/124.158
(58) Field of Classification Search ............. 280/124.16, 280/124.158, 124.161; 180/209, 24.02
See application file for complete search history.

(56) References Cited

U.S. PATENT DOCUMENTS

| | | | |
|---|---|---|---|
| 5,447,332 A * | 9/1995 | Heyring | 280/124.104 |
| 6,386,554 B1 | 5/2002 | Weddle | |
| 6,428,024 B1 * | 8/2002 | Heyring et al. | 280/124.106 |

OTHER PUBLICATIONS

Equipment Technologies; 2010 Apache Series Sprayers; 2009; www.etsprayers.com/dealer; 6 pages.
Tenneco Inc.; New Monroe Kinetic Suspension Technology from Tenneco Automotive acquired in 1999; www.tenneco.com/news/archive/257; 2 pages.
Case H—SPX Series Patriot Sprayers; see item (c) on p. 13 regarding Optional Active Suspension; CNH America LLC; USA; 2004; 16 pages.
The New 2005 Apache Sprayer—The Number One Mechanical Drive Sprayer; Equipment Technologies; 2005; Mooresville, Indiana; 2 pages.

* cited by examiner

*Primary Examiner* — Eric Culbeth
(74) *Attorney, Agent, or Firm* — Whyte Hirschboeck Dudek S.C.

(57) ABSTRACT

An agricultural vehicle comprises separate wheel suspension assemblies corresponding to each wheel of the vehicle. Each wheel suspension assembly includes a strut assembly wherein the strut assembly is connected to the chassis at a pivot and to a respective wheel, and a dual action hydraulic cylinder that is connected to both the strut assembly at a point distal from the pivot and the chassis of the vehicle. Motion of the strut assembly around the pivot is affected by action of the hydraulic cylinder. In some embodiments, the dual action hydraulic cylinders are in fluid communication with the diagonally opposite hydraulic cylinder such that when one cylinder moves into an extended or retracted position the other diagonally opposite cylinder is urged into the same position. In some embodiments, the wheel suspension assemblies are attached to slidable drawer assemblies on each side of the vehicle. These drawer assemblies can be moved relative to the centerline of the vehicle to change the spacing between the wheels on each side of the vehicle.

28 Claims, 6 Drawing Sheets

SUSPENSION SYSTEM FOR AN AGRICULTURAL VEHICLE

CROSS-REFERENCE TO RELATED APPLICATIONS

This application claims priority to U.S. Provisional Patent Application No. 61/083,090 entitled "Suspension System for a High Clearance Agricultural Vehicle" filed on Jul. 23, 2008, and which is hereby incorporated by reference.

FIELD OF THE INVENTION

The present invention relates generally to agricultural vehicles and more specifically to suspension systems for agricultural vehicles such as high clearance sprayers.

BACKGROUND OF THE INVENTION

Crops frequently need to be tended at various stages during their growth. For example, fields of growing crops may need to be treated with various agents such as insecticides and weed killers. These agents are typically applied by spraying. In order to avoid damaging the crop plants while applying the spray, high clearance sprayers have been developed. Such sprayers can have up to about 6 feet of clearance from the ground allowing the sprayer to pass over the top of tall crops such as corn. In order to minimize the time required to spray a field, these sprayers frequently have long spray booms that may extend 90 feet to each side of the sprayer.

The sprayer must be maintained in a level position in order to prevent the spray booms from plunging into the crops and damaging a swath of plants. However, maintaining the sprayer in a level position is difficult due to irregularities in the ground and the high center of gravity of the sprayer. For example, the high center of gravity can increase the tilt of the sprayer when the sprayer is being turned. Therefore, the industry is always searching for suspension systems capable of meeting the needs of high clearance sprayers. Also, the suspension system should provide for a comfortable ride over rough terrain in order to reduce operator fatigue.

BRIEF SUMMARY OF THE INVENTION

In at least some embodiments, the present invention relates to an agricultural vehicle such as a sprayer with a suspension system having a right front wheel suspension assembly, a right rear wheel suspension assembly, a left front wheel suspension assembly and a left rear wheel suspension assembly. Each independent wheel suspension assembly comprises a strut assembly wherein the strut assembly is connected to the sprayer at a pivot and to a wheel hub, and wherein a dual action hydraulic cylinder is operationally connected to the strut assembly at a point distal from the pivot and is also operationally connected to the sprayer such that motion of the strut assembly around the pivot is affected by action of the hydraulic cylinder. Each hydraulic cylinder is hydraulically connected, through flow restrictors, to accumulators to provide appropriate elastic and dampening properties for the suspension system.

In some embodiments, the dual action hydraulic cylinders are in fluid communication with a corresponding diagonally opposite hydraulic cylinder such that when one cylinder moves into an extended or retracted position, then the other cylinder is urged into the same position.

In some embodiments, the front and rear wheel suspension assemblies are attached to slidable drawer assemblies on the left and the right sides of the sprayer. These drawer assemblies can be moved relative to the centerline of the sprayer to change the spacing between the wheels on each side of the sprayer.

BRIEF DESCRIPTION OF THE DRAWINGS

Preferred embodiments of the invention are described below with reference to the following accompanying drawings, which are for illustrative purposes only. Throughout the following views, reference numerals will be used in the drawings, and the same reference numerals will be used throughout the several views and in the description to indicate same or like parts or steps.

DETAILED DESCRIPTION OF THE PREFERRED EMBODIMENT

In the following detailed description, references are made to the accompanying drawings that form a part hereof, and in which is shown by way of illustration specific embodiments of the invention. These embodiments are described in sufficient detail to enable those skilled in the art to practice the invention, and it is to be understood that other embodiments may be utilized and that structural changes may be made without departing from the spirit and scope of the present invention.

Figure 1:
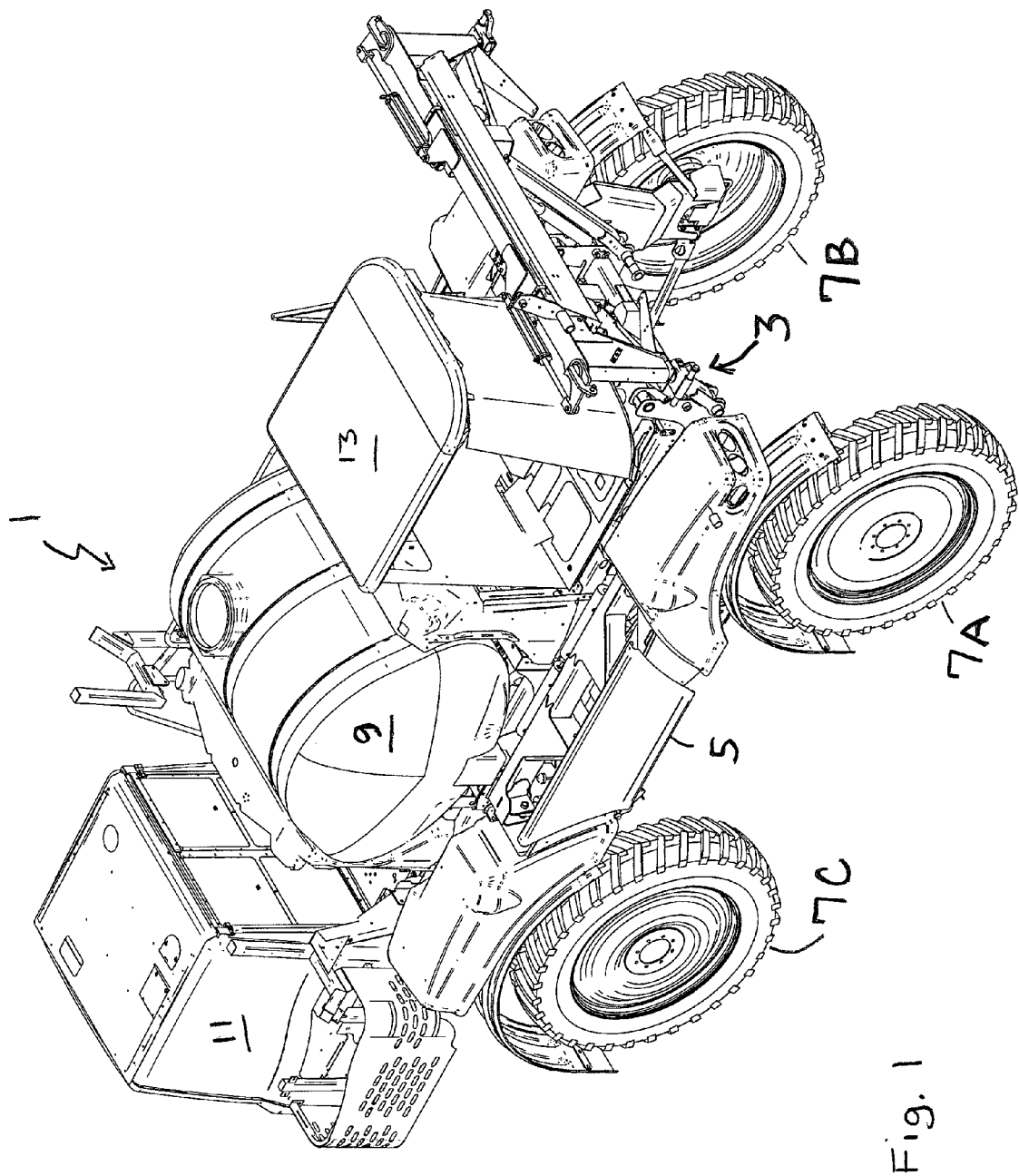
FIG. 1 is an oblique top-side view of a sprayer in accordance with at least one aspect of the current invention.
Figure 2:
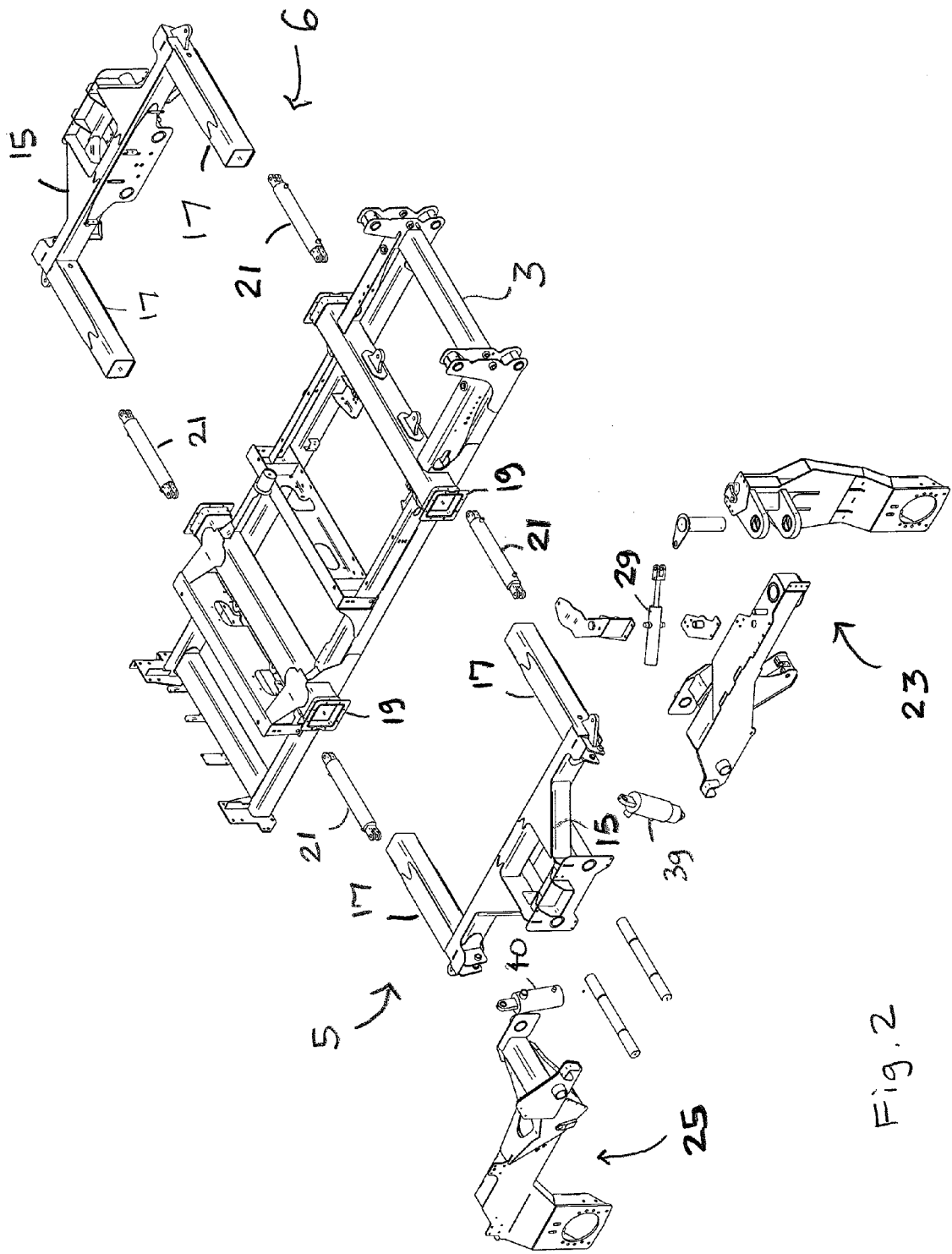
FIG. 2 is an exploded side view of the chassis and slidable drawer assembly of the sprayer of FIG. 1.

Referring to FIGS. 1 and 2, a high clearance agricultural sprayer 1 is shown. Sprayer 1 comprises a chassis 3 and a right slidable drawer assembly 5 and a left slidable drawer assembly 6 that can each move back and forth into chassis 3 to change the distance between the wheels (one shown) 7B on the left and the wheels 7A, 7C on the right of the sprayer 1. A large tank 9 is mounted on chassis 3 to contain the fluid to be sprayed. An engine and hydraulic pump module 11 is provided on the back of the sprayer 1 to supply power for the pumps and to the drive wheels. A cab 13 is also mounted on the chassis 3 to provide a comfortable location for the operator to sit when driving the sprayer 1.

In particular with respect to the drawer assemblies, as shown in FIG. 2, each of the drawer assemblies 5, 6 includes a respective slidable member 15. Each slidable member 15 comprises two slides 17 which each engage with a channel 19 in chassis 3. Specifically, slides 17 are designed to slide back and forth within channels 19. The position of each slidable member 15 is controlled by two hydraulic cylinders 21 located adjacent to each slide 17. In this manner, each of the slidable drawer assemblies 5, 6 is selectively movable to positions nearer or farther from a centerline extending from a front end of the sprayer to a rear end of the sprayer.

Figure 6:
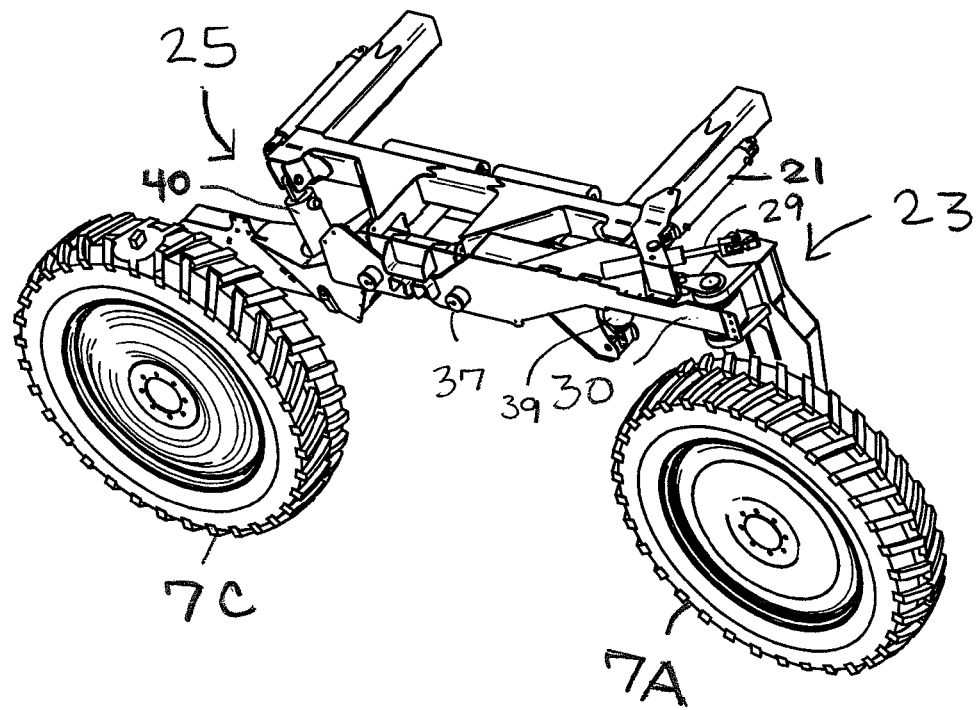
FIG. 6 is a perspective outside view of the front wheel suspension assembly and the back wheel suspension assembly, each connected to the agricultural sprayer and to a respective wheel.
Figure 7:
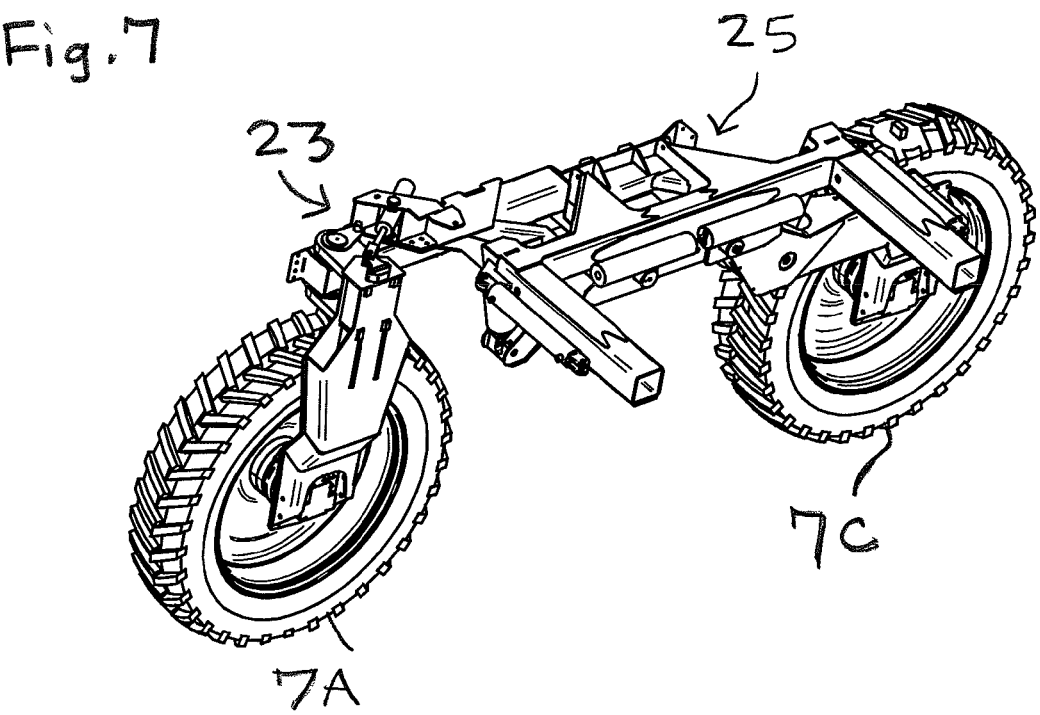
FIG. 7 is a perspective inside view of the front wheel suspension assembly and the back wheel suspension assembly shown in FIG. 6.

As explained in more detail below, the agricultural sprayer 1 includes a suspension system which includes four separate suspension assemblies, each corresponding to a respective wheel of the sprayer. Two of the suspension assemblies, a right front wheel suspension assembly 23, and a right rear wheel suspension assembly 25, are illustrated in FIGS. 2, 6, and 7. Although not specifically illustrated, a left front wheel suspension assembly is similar to the right front wheel suspension assembly 23, and a left rear wheel suspension assembly is similar to the right rear wheel suspension assembly 25. The right front and rear wheel suspension assemblies 23, 25 each attach to the right slidable drawer assembly 5 (specifically, to slidable member 15), while left front and rear suspension assemblies (not shown) each attach to the left slidable drawer assembly 6. Further, as shown in FIGS. 6 and 7, the right front wheel suspension assembly 23 is also connected to the right front wheel 7A, and the right rear suspension assembly 25 is also connected to the right rear wheel 7C.

Figure 3:
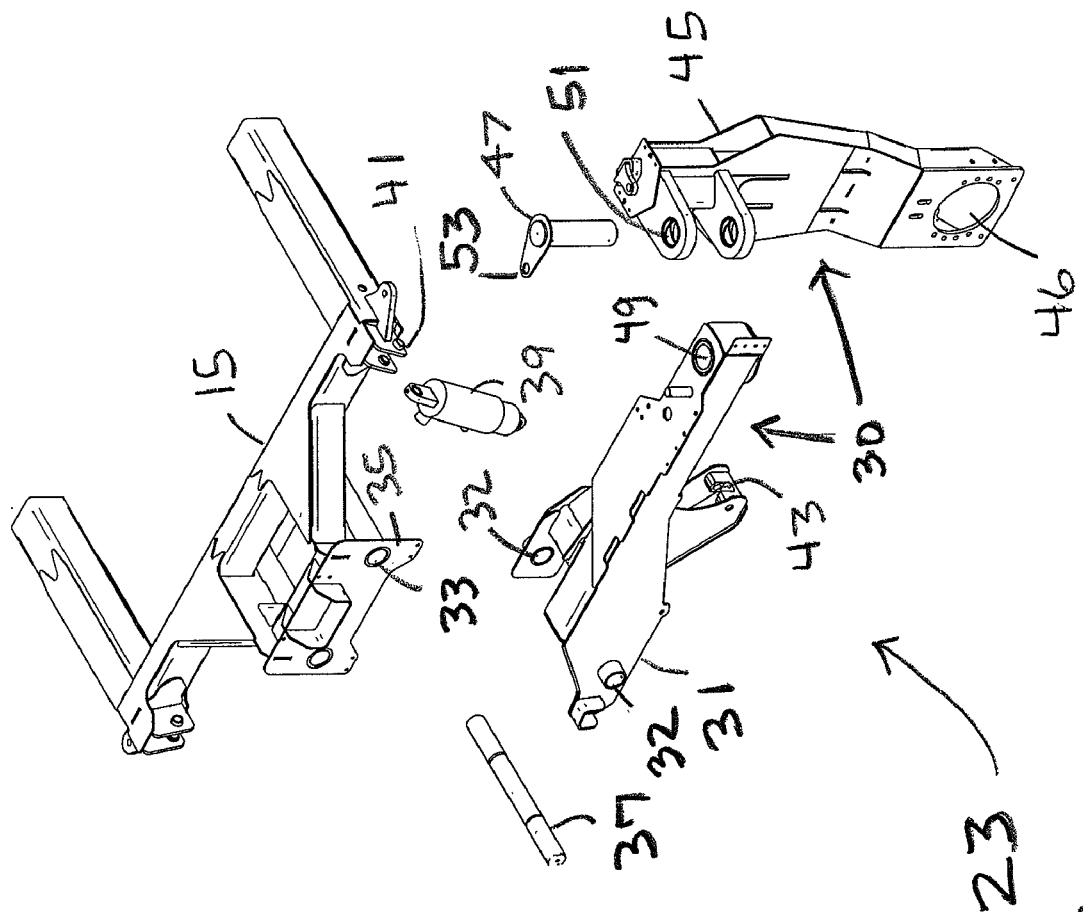
FIG. 3 is an exploded view of the suspension assembly for the right front wheel.

Referring to FIGS. 3, 6, and 7, the front suspension assembly 23 comprises a strut assembly 30 which includes a horizontal strut 31 and a vertical strut 45. Horizontal strut 31 is mounted on bracket 35 of slidable member 15. A pin 37 is inserted through holes 32 in horizontal strut 31 and through channel 33 in bracket 35. This arrangement allows horizontal strut 31 to pivot around pin 37. Here the pivot is behind the wheel 7A.

A dual-acting hydraulic cylinder 39 is attached between mounting bracket 43 on horizontal strut 31 and mounting bracket 41 on slidable member 15. Extension and retraction of a piston rod in hydraulic cylinder 39 serves to dampen and control the pivot motion of the horizontal strut 31. The vertical strut 45 mounts onto the horizontal strut 31 and connects to at mount 46 to the hub of front wheel 7A. A pin 47 is inserted through holes 51 in vertical strut 45 and through channel 49 in horizontal strut 31. This allows the vertical strut 45 to pivot in relation to the horizontal strut 31. Hydraulic cylinder 29 (shown in FIG. 2) is connected between vertical strut 45 and horizontal strut 31. Action of the hydraulic cylinder 29 affects the relative position of vertical strut 45 in relation to horizontal strut 31 to effect steering of the sprayer 1.

In summary, the right front wheel suspension assembly 23 includes a strut assembly 30 wherein the strut assembly 30 is connected to the sprayer 1 at a pivot, such as formed at pin 37, and is connected to the wheel hub at mount 46. The dual action hydraulic cylinder 39 is operationally connected to the strut assembly 30 at a point, such as bracket 43, which is distal from the pivot. The hydraulic cylinder 39 is also operationally connected to the sprayer 1, such as at mounting bracket 41 of slidable member 15, such that motion of the strut assembly 30 around the pivot is affected by action of the hydraulic cylinder 39, such as extension or retraction of the piston rod of cylinder 39.

Figure 4:
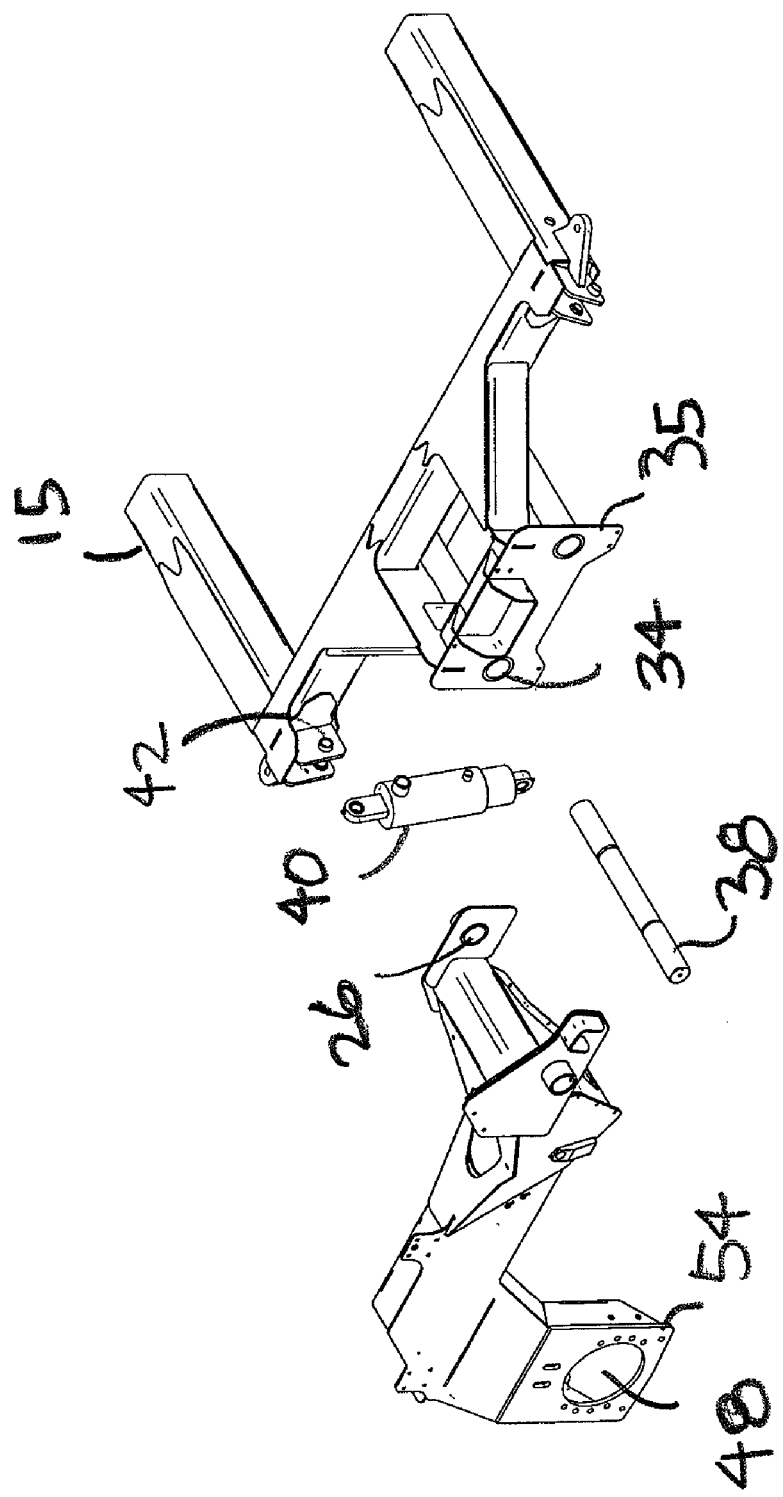
FIG. 4 is an exploded view of the suspension assembly for the right rear wheel.

The right rear suspension assembly 25 is shown in FIGS. 4, 6, and 7, and is similar to the front suspension assembly 23 and also operates in a similar manner. Here, the strut assembly is formed as a combination strut 54, which combines the horizontal strut 31 and the vertical strut 45 of front suspension assembly 23. In other embodiments, a strut assembly like strut assembly 30 can be used in order to allow for independent steering of a rear wheel. The combination strut 54 is also mounted to the bracket 35 of slidable member 15 and is connected at mount 48 to the hub of rear wheel 7C. A pin 38 is inserted through holes 26 of the combination strut 54 and through channel 34 in bracket 35. This allows combination strut 54 to pivot around pin 38. Here the pivot is ahead of the wheel 7C. The pivot motion of combination strut 54 is dampened and controlled by a dual-acting hydraulic cylinder 40 mounted between a bracket 42 on sliding member 15 and a bracket (not shown but similar to bracket 43 on strut 31 in FIG. 3) on combination strut 54.

In summary, right rear wheel suspension assembly 25 includes a strut assembly such as combination strut 54 wherein the strut assembly is connected to the sprayer 1 at a pivot, such as formed at pin 38, and to a wheel, such as at the hub of rear wheel 7C at mount 48. A dual action hydraulic cylinder 40 is operationally connected to the strut assembly at a point distal from the first pivot and is also operationally connected to the sprayer, such as at mounting bracket 42 of slidable member 15, such that motion of the strut assembly around the pivot is affected by action of the hydraulic cylinder 40, such as extension and retraction of the piston rod of cylinder 40.

By attaching both front and rear wheels (e.g., right front wheel 7A and right rear wheel 7C) to the same slidable member 15, alignment of the rear wheel behind the front wheel is assured.

Figure 5:
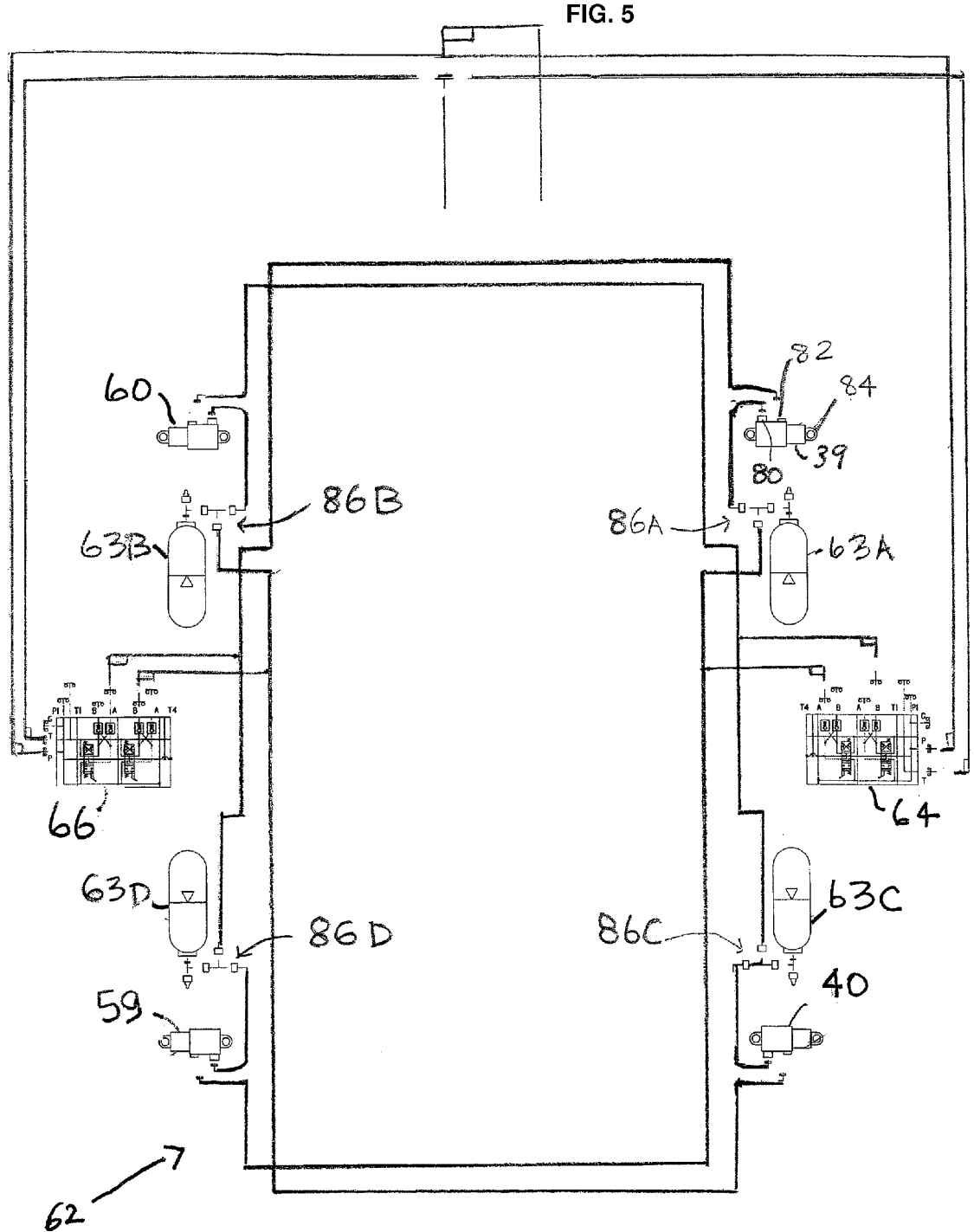
FIG. 5 is a schematic view of the hydraulic system cross-connecting the independent suspension assemblies.

FIG. 5 is a schematic view of a hydraulic system 62. In particular, as noted above, the left front and rear wheel suspension assemblies are similar to the right front and rear suspension assemblies, such that the left front wheel suspension assembly includes a hydraulic cylinder 59, and the left rear wheel suspension assembly includes a hydraulic cylinder 60, as shown in FIG. 5. The hydraulic system 62 also includes accumulators 63A-D, various lines, hoses, and fittings, such as T-fittings 86A-D, and dual valves 64 and 66 for controlling hydraulic fluid from a reservoir (not shown). Each accumulator 63 has two chambers separated by a diaphragm, with hydraulic fluid in one and a compressible gas in the other.

Each of the hydraulic cylinders 39, 40, 59 and 60 is similar to the others and operates in a similar manner. Specifically with respect to right front hydraulic cylinder 39, it includes a base port 80, a rod port 82, and a movable piston rod 84. Hydraulic fluid entering the base port 80 causes the piston rod 84 to extend, and hydraulic fluid entering the rod port 82 causes the piston rod 84 to retract. The base port 80 is in fluid communication with the hydraulic fluid chamber of a respective associated accumulator 63A via an associated T-fitting 86A. In operation, when the right front wheel 7A goes over a bump for example, the piston rod 84 retracts, causing hydraulic fluid to exit the base port 80 and flow to the hydraulic fluid chamber of the associated accumulator 63A. When the sprayer 1 travels over the bump, fluid from this chamber of the accumulator 63A flows back into the base port 80 causing the piston rod 82 to extend to its previous position. In this manner, the hydraulic cylinder 39, linked between the wheel 7A and the chassis 3, essentially operates as a spring, and the accumulator 63A essentially operates as a damper or shock absorber.

The dual valves 64 and 66 each include two self leveling valves, with one valve associated with each of the four suspension assemblies. The self leveling valve on each assembly controls the amount of hydraulic fluid (from a source, not shown) in the associated accumulator such that a desired neutral position (approximately the mid-stroke position) of the piston rod in each of the hydraulic cylinders can be achieved based on the load of the sprayer. In this manner, each piston rod is movable a sufficient amount in each direction to achieve the necessary pivot motion of the strut assemblies, and constant vehicle height can be maintained over the entire load range of the sprayer.

System 62 also cross-connects the independent suspension assemblies. Cylinder 39 is in fluid communication with the identical cylinder 59 on the diagonally opposite side of the sprayer 1. Specifically, the base port 80 of cylinder 39 is in fluid communication (via the T fitting 86A) with the rod port of cylinder 59 and the base port of cylinder 59 completes the loop by connecting (via another T-fitting 86D) to rod port of cylinder 39. Similarly, the hydraulic cylinder 40 is in fluid communication with the identical cylinder 60 on the diagonally opposite side of the sprayer 1 via T-fittings 86B and 86C. These interconnections are cross-piped in this manner such that when a dual action cylinder 39 or 40 in one assembly moves to an extended or a retracted position (due to irregularities in the terrain or forces associated with sprayer 1 turning), then the associated cylinder 59 or 60 in the diagonally opposite assembly would also be urged to the same extended or retracted position. Likewise, if the cylinder 59 or 60 is forced to an extended or a retracted position, then the associated cylinder 39 or 40 in the diagonally opposite assembly would be urged to the same extended or retracted position. This cross action of the cylinders helps to maintain sprayer 1 in a stable horizontal orientation, such that chassis 3 remains level, and approximately equal weight distribution to all four wheels is maintained.

A level orientation of the sprayer 1 also maintains approximately equal weight distribution among the wheels 7. This, in turn, reduces overall soil compaction, reduces injury to crop roots, and improves tractive effort when low soil adhesion conditions exist, such as under muddy conditions.

It is specifically intended that the present invention not be limited to the embodiments and illustrations contained herein, but include modified forms of those embodiments including portions of the embodiments and combinations of elements of different embodiments as come within the scope of the following claims.

I claim:

1. An agricultural vehicle comprising:
   a right front wheel suspension assembly comprising a first strut assembly and a first dual action hydraulic cylinder, wherein the first strut assembly is connected to the vehicle at a first pivot and is connected to a right front wheel, and wherein the first hydraulic cylinder is operationally connected to the first strut assembly at a point distal from the first pivot and is also operationally connected to the vehicle such that motion of the first strut assembly around the first pivot is affected by action of the first hydraulic cylinder;
   a right rear wheel suspension assembly comprising a second strut assembly and a second dual action hydraulic cylinder, wherein the second strut assembly is connected to the vehicle at a second pivot and is connected to a right rear wheel, and wherein the second hydraulic cylinder is operationally connected to the second strut assembly at a point distal from the second pivot and is also operationally connected to the vehicle such that motion of the second strut assembly around the second pivot is affected by action of the second hydraulic cylinder;
   a left front wheel suspension assembly comprising a third strut assembly and a third dual action hydraulic cylinder, wherein the third strut assembly is connected to the vehicle at a third pivot and is connected to a left front wheel, and wherein the third hydraulic cylinder is operationally connected to the third strut assembly at a point distal from the third pivot and is also operationally connected to the vehicle such that motion of the third strut assembly around the third pivot is affected by action of the third hydraulic cylinder;
   a left rear wheel suspension assembly comprising a fourth strut assembly and a fourth dual action hydraulic cylinder, wherein the fourth strut assembly is connected to the vehicle at a fourth pivot and is connected to a left front wheel, and wherein the fourth hydraulic cylinder is operationally connected to the fourth strut assembly at a point distal from the fourth pivot and is also operationally connected to the vehicle such that motion of the fourth strut assembly around the fourth pivot is affected by action of the fourth hydraulic cylinder; and
   a pair of dual valves that are operably associated with the right front wheel, right left wheel, left front wheel and left rear wheel suspension assemblies.

2. The agricultural vehicle of claim 1, wherein the first hydraulic cylinder is in fluid communication with the fourth hydraulic cylinder and the second hydraulic cylinder is in fluid communication with the third hydraulic cylinder.

3. The agricultural vehicle of claim 2, wherein:
   motion of the first hydraulic cylinder to an extended or a retracted position is communicated to the fourth hydraulic cylinder, and vice versa; and,
   motion of the second hydraulic cylinder to an extended or a retracted position is communicated to the third hydraulic cylinder, and vice versa.

4. The agricultural vehicle of claim 3, wherein:
   when the first hydraulic cylinder is moved to an extended or a retracted position, the fourth hydraulic cylinder is urged to move towards the same extended or retracted position, and vice versa; and
   when the second hydraulic cylinder is moved to an extended or a retracted position, the third hydraulic cylinder is urged to move towards the same extended or retracted position, and vice versa.

5. The agricultural vehicle of claim 1, further comprising a right slidable drawer assembly and a left slidable drawer assembly, wherein each drawer assembly is independently movable to change the spacing between the left wheels and the right wheels.

6. The agricultural vehicle of claim 5, wherein the left front wheel suspension assembly and the left rear wheel suspension assembly are connected to the left slidable drawer assembly and the right front wheel suspension assembly and the right rear wheel suspension assembly are connected to the right slidable drawer assembly.

7. The agricultural vehicle of claim 1, further comprising a right slidable drawer assembly and a left slidable drawer assembly, wherein the slidable drawer assemblies are each slidably engaged with the vehicle such that each drawer assembly is selectively moveable to positions nearer or farther from a centerline extending from a front end of the vehicle to a rear end of the vehicle.

8. An agricultural sprayer comprising:
   a chassis;
   a right front wheel suspension assembly, a right rear wheel suspension assembly, a left front wheel suspension assembly, and a left rear wheel suspension assembly, each wheel suspension assembly including an associated strut assembly and an associated dual action hydraulic cylinder, wherein each strut assembly is connected to the chassis at a respective pivot and is connected to a respective wheel hub, wherein each hydraulic cylinder is operationally connected to the chassis and to a respective associated strut assembly at a point distal from the respective pivot such that action of that hydraulic cylinder causes the respective associated strut assembly to move around the respective pivot; and
   a pair of dual valves that are operably associated with the right front wheel, right left wheel, left front wheel and left rear wheel suspension assemblies.

9. The agricultural sprayer of claim 8, wherein the hydraulic cylinder associated with the right front wheel suspension assembly is in fluid communication with the hydraulic cylinder associated with the left rear wheel suspension assembly, and the hydraulic cylinder associated with the right rear suspension assembly is in fluid communication with the hydraulic cylinder associated with the left front wheel suspension assembly.

10. The agricultural sprayer of claim 9, wherein:
motion of the hydraulic cylinder associated with the right front wheel suspension assembly to an extended or a retracted position is communicated to the hydraulic cylinder associated with the left rear wheel suspension assembly, and vice versa; and,
motion of the hydraulic cylinder associated with the right rear wheel suspension assembly to an extended or a retracted position is communicated to the hydraulic cylinder associated with the left front wheel suspension assembly, and vice versa.

11. The agricultural sprayer of claim 10, wherein:
when the hydraulic cylinder associated with right front wheel suspension assembly is moved to an extended or retracted position, the hydraulic cylinder associated with the left rear wheel suspension assembly is urged to move towards the same extended or retracted position, and vice versa; and
when the hydraulic cylinder associated with the right rear wheel suspension assembly is moved to an extended or retracted position, the hydraulic cylinder associated with the left front urged to move towards the same extended or retracted position, and vice versa.

12. The agricultural sprayer of claim 8, wherein the chassis further includes a right slidable drawer assembly and a left slidable drawer assembly, wherein each drawer assembly is independently movable to change the spacing between the left front and rear wheel suspension assemblies and the right front and rear wheel suspension assemblies.

13. The agricultural sprayer of claim 12, wherein the left front wheel suspension assembly and the left rear wheel suspension assembly are connected to the left slidable drawer assembly and the right front wheel suspension assembly and the right rear wheel suspension assembly are connected to the right slidable drawer assembly.

14. The agricultural sprayer of claim 8, further comprising a right slidable drawer assembly and a left slidable drawer assembly, wherein the slidable drawer assemblies are each slidably engaged with the sprayer such that each drawer assembly is selectively movable to positions nearer or farther from a centerline extending from a front end of the sprayer to a rear end of the sprayer.

15. The agricultural sprayer of claim 8, wherein each hydraulic cylinder is in fluid communication with a respective accumulator.

16. The agricultural sprayer of claim 15, wherein each accumulator includes a fluid portion and a gas portion.

17. The agricultural sprayer of claim 8, wherein a base port of the hydraulic cylinder associated with the right front wheel suspension assembly is in fluid communication via a first T-fitting with a rod port of the hydraulic cylinder associated with the left rear wheel suspension assembly, and a base port of the hydraulic cylinder associated with the left rear wheel suspension assembly is in fluid communication via a second T-filling with a rod port of the hydraulic cylinder associated with the right front wheel suspension assembly, and a base port of the hydraulic cylinder associated with the left front wheel suspension assembly is in fluid communication via a third T-fitting with a rod port of the hydraulic cylinder associated with the right rear wheel suspension assembly, and a base port of the hydraulic cylinder associated with the right rear wheel suspension assembly is in fluid communication via a fourth T-filling with a rod port of the hydraulic cylinder associated with the left front wheel suspension assembly.

18. An agricultural sprayer comprising:
a chassis; and
a right front wheel suspension assembly;
a right rear wheel suspension assembly;
a left front wheel suspension assembly; and
a left rear wheel suspension assembly;
wherein each wheel suspension assembly includes an associated strut assembly and an associated dual action hydraulic cylinder, wherein each strut assembly is connected to the chassis at a respective pivot and is connected to a respective wheel hub, wherein each hydraulic cylinder is operationally connected to the chassis and to a respective associated strut assembly at a point distal from the respective pivot such that action of that hydraulic cylinder causes the respective associated strut assembly to move around the respective pivot, wherein the hydraulic cylinder associated with the right front wheel suspension assembly is in fluid communication with the hydraulic cylinder associated with the left rear wheel suspension assembly, and the hydraulic cylinder associated with the right rear suspension assembly is in fluid communication with the hydraulic cylinder associated with the left front wheel suspension assembly, wherein when the hydraulic cylinder associated with right front wheel suspension assembly is moved to an extended or retracted position, the hydraulic cylinder associated with the left rear wheel suspension assembly is urged to move towards the same extended or retracted position, and vice versa, and wherein when the hydraulic cylinder associated with the right rear wheel suspension assembly is moved to an extended or retracted position, the hydraulic cylinder associated with the left front urged to move towards the same extended or retracted position, and vice versa; and
a pair of dual valves that are operably associated with the right front wheel, right left wheel, left front wheel and left rear wheel suspension assemblies.

19. The agricultural sprayer of claim 18, wherein the chassis further includes a right slidable drawer assembly and a left slidable drawer assembly, wherein each drawer assembly is independently movable to change the spacing between the left wheels and the right wheels, and wherein the left front wheel suspension assembly and the left rear wheel suspension assembly are connected to the left slidable drawer assembly and the right front wheel suspension assembly and the right rear wheel suspension assembly are connected to the right slidable drawer assembly.

20. The agricultural sprayer of claim 18, wherein each hydraulic cylinder is in fluid communication with a respective accumulator, and wherein each accumulator includes a fluid portion and a gas portion.

21. The agricultural sprayer of claim 20, wherein a base port of the hydraulic cylinder associated with the right front wheel suspension assembly is in fluid communication via a first T-fitting with a rod port of the hydraulic cylinder associated with the left rear wheel suspension assembly, and a base port of the hydraulic cylinder associated with the left rear wheel suspension assembly is in fluid communication via a second T-filling with a rod port of the hydraulic cylinder associated with the right front wheel suspension assembly, and a base port of the hydraulic cylinder associated with the left front wheel suspension assembly is in fluid communication via a third T-fitting with a rod port of the hydraulic cylinder associated with the right rear wheel suspension assembly, and a base port of the hydraulic cylinder associated with the right rear wheel suspension assembly is in fluid communication via a fourth T-filling with a rod port of the hydraulic cylinder associated with the left front wheel suspension assembly.

22. An agricultural vehicle comprising:
   a right front wheel suspension assembly comprising a first strut assembly and a first dual action hydraulic cylinder, wherein the first strut assembly is connected to the vehicle at a first pivot and is connected to a right front wheel, and wherein the first hydraulic cylinder is operationally connected to the first strut assembly at a point distal from the first pivot and is also operationally connected to the vehicle such that motion of the first strut assembly around the first pivot is affected by action of the first hydraulic cylinder;
   a right rear wheel suspension assembly comprising a second strut assembly and a second dual action hydraulic cylinder, wherein the second strut assembly is connected to the vehicle at a second pivot and is connected to a right rear wheel, and wherein the second hydraulic cylinder is operationally connected to the second strut assembly at a point distal from the second pivot and is also operationally connected to the vehicle such that motion of the second strut assembly around the second pivot is affected by action of the second hydraulic cylinder;
   a left front wheel suspension assembly comprising a third strut assembly and a third dual action hydraulic cylinder, wherein the third strut assembly is connected to the vehicle at a third pivot and is connected to a left front wheel, and wherein the third hydraulic cylinder is operationally connected to the third strut assembly at a point distal from the third pivot and is also operationally connected to the vehicle such that motion of the third strut assembly around the third pivot is affected by action of the third hydraulic cylinder;
   a left rear wheel suspension assembly comprising a fourth strut assembly and a fourth dual action hydraulic cylinder, wherein the fourth strut assembly is connected to the vehicle at a fourth pivot and is connected to a left front wheel, and wherein the fourth hydraulic cylinder is operationally connected to the fourth strut assembly at a point distal from the fourth pivot and is also operationally connected to the vehicle such that motion of the fourth strut assembly around the fourth pivot is affected by action of the fourth hydraulic cylinder; and
   a right slidable drawer assembly and a left slidable drawer assembly, wherein each drawer assembly is independently movable to change the spacing between the left wheels and the right wheels.

23. The agricultural vehicle of claim 22, wherein the left front wheel suspension assembly and the left rear wheel suspension assembly are connected to the left slidable drawer assembly and the right front wheel suspension assembly and the right rear wheel suspension assembly are connected to the right slidable drawer assembly.

24. An agricultural vehicle comprising:
   a right front wheel suspension assembly comprising a first strut assembly and a first dual action hydraulic cylinder, wherein the first strut assembly is connected to the vehicle at a first pivot and is connected to a right front wheel, and wherein the first hydraulic cylinder is operationally connected to the first strut assembly at a point distal from the first pivot and is also operationally connected to the vehicle such that motion of the first strut assembly around the first pivot is affected by action of the first hydraulic cylinder;
   a right rear wheel suspension assembly comprising a second strut assembly and a second dual action hydraulic cylinder, wherein the second strut assembly is connected to the vehicle at a second pivot and is connected to a right rear wheel, and wherein the second hydraulic cylinder is operationally connected to the second strut assembly at a point distal from the second pivot and is also operationally connected to the vehicle such that motion of the second strut assembly around the second pivot is affected by action of the second hydraulic cylinder;
   a left front wheel suspension assembly comprising a third strut assembly and a third dual action hydraulic cylinder, wherein the third strut assembly is connected to the vehicle at a third pivot and is connected to a left front wheel, and wherein the third hydraulic cylinder is operationally connected to the third strut assembly at a point distal from the third pivot and is also operationally connected to the vehicle such that motion of the third strut assembly around the third pivot is affected by action of the third hydraulic cylinder;
   a left rear wheel suspension assembly comprising a fourth strut assembly and a fourth dual action hydraulic cylinder, wherein the fourth strut assembly is connected to the vehicle at a fourth pivot and is connected to a left front wheel, and wherein the fourth hydraulic cylinder is operationally connected to the fourth strut assembly at a point distal from the fourth pivot and is also operationally connected to the vehicle such that motion of the fourth strut assembly around the fourth pivot is affected by action of the fourth hydraulic cylinder; and
   a right slidable drawer assembly and a left slidable drawer assembly, wherein the slidable drawer assemblies are each slidably engaged with the vehicle such that each drawer assembly is selectively moveable to positions nearer or farther from a centerline extending from a front end of the vehicle to a rear end of the vehicle.

25. An agricultural sprayer comprising:
   a chassis; and
   a right front wheel suspension assembly, a right rear wheel suspension assembly, a left front wheel suspension assembly, and a left rear wheel suspension assembly, each wheel suspension assembly including an associated strut assembly and an associated dual action hydraulic cylinder, wherein each strut assembly is connected to the chassis at a respective pivot and is connected to a respective wheel hub, wherein each hydraulic cylinder is operationally connected to the chassis and to a respective associated strut assembly at a point distal from the respective pivot such that action of that hydraulic cylinder causes the respective associated strut assembly to move around the respective pivot;
   wherein the chassis further includes a right slidable drawer assembly and a left slidable drawer assembly, wherein each drawer assembly is independently movable to change the spacing between the left front and rear wheel suspension assemblies and the right front and rear wheel suspension assemblies.

26. The agricultural sprayer of claim 25, wherein the left front wheel suspension assembly and the left rear wheel suspension assembly are connected to the left slidable drawer assembly and the right front wheel suspension assembly and the right rear wheel suspension assembly are connected to the right slidable drawer assembly.

27. An agricultural sprayer comprising:
a chassis;
a right front wheel suspension assembly, a right rear wheel suspension assembly, a left front wheel suspension assembly, and a left rear wheel suspension assembly, each wheel suspension assembly including an associated strut assembly and an associated dual action hydraulic cylinder, wherein each strut assembly is connected to the chassis at a respective pivot and is connected to a respective wheel hub, wherein each hydraulic cylinder is operationally connected to the chassis and to a respective associated strut assembly at a point distal from the respective pivot such that action of that hydraulic cylinder causes the respective associated strut assembly to move around the respective pivot; and
a right slidable drawer assembly and a left slidable drawer assembly, wherein the slidable drawer assemblies are each slidably engaged with the sprayer such that each drawer assembly is selectively movable to positions nearer or farther from a centerline extending from a front end of the sprayer to a rear end of the sprayer.

28. An agricultural sprayer comprising:
a chassis; and
a right front wheel suspension assembly;
a right rear wheel suspension assembly;
a left front wheel suspension assembly; and
a left rear wheel suspension assembly;
wherein each wheel suspension assembly includes an associated strut assembly and an associated dual action hydraulic cylinder, wherein each strut assembly is connected to the chassis at a respective pivot and is connected to a respective wheel hub, wherein each hydraulic cylinder is operationally connected to the chassis and to a respective associated strut assembly at a point distal from the respective pivot such that action of that hydraulic cylinder causes the respective associated strut assembly to move around the respective pivot, wherein the hydraulic cylinder associated with the right front wheel suspension assembly is in fluid communication with the hydraulic cylinder associated with the left rear wheel suspension assembly, and the hydraulic cylinder associated with the right rear suspension assembly is in fluid communication with the hydraulic cylinder associated with the left front wheel suspension assembly, wherein when the hydraulic cylinder associated with right front wheel suspension assembly is moved to an extended or retracted position, the hydraulic cylinder associated with the left rear wheel suspension assembly is urged to move towards the same extended or retracted position, and vice versa, and wherein when the hydraulic cylinder associated with the right rear wheel suspension assembly is moved to an extended or retracted position, the hydraulic cylinder associated with the left front urged to move towards the same extended or retracted position, and vice versa; and
wherein the chassis further includes a right slidable drawer assembly and a left slidable drawer assembly, wherein each drawer assembly is independently movable to change the spacing between the left front and rear wheel suspension assemblies and the right front and rear wheel suspension assemblies, and wherein the left front wheel suspension assembly and the left rear wheel suspension assembly are connected to the left slidable drawer assembly and the right front wheel suspension assembly and the right rear wheel suspension assembly are connected to the right slidable drawer assembly.

\* \* \* \* \*